(12) United States Patent
Warren

(10) Patent No.: US 6,752,399 B2
(45) Date of Patent: Jun. 22, 2004

(54) VAT SEAL

(75) Inventor: Peter Warren, Bateman (AU)

(73) Assignee: Westbridge Pty LTD, Leeming (AU)

(*) Notice: Subject to any disclaimer, the term of this patent is extended or adjusted under 35 U.S.C. 154(b) by 0 days.

(21) Appl. No.: 10/190,941

(22) Filed: Jul. 8, 2002

(65) Prior Publication Data
US 2004/0004328 A1 Jan. 8, 2004

(51) Int. Cl.[7] .................... F16J 15/02; B65D 88/00
(52) U.S. Cl. .............. 277/640; 277/628; 277/637; 217/4; 220/355; 220/608
(58) Field of Search ................. 220/355, 796, 220/797, 802, 780, 789, 608; 217/4, 13, 88; 277/628, 630, 637, 638, 640, 641, 645

(56) References Cited

U.S. PATENT DOCUMENTS

| | | | | |
|---|---|---|---|---|
| 2,475,836 A | * | 7/1949 | Henricksen et al. | 403/288 |
| 4,930,790 A | * | 6/1990 | Sheridan | 277/630 |
| 4,953,730 A | * | 9/1990 | Prime et al. | 217/4 |

* cited by examiner

Primary Examiner—Anthony Knight
Assistant Examiner—E. Peavey

(57) ABSTRACT

The invention is directed to a wine vat having a metal hoop forming the top, end walls and bottom, and with wooden side walls pressed in sealing engagement with the side edges of the metal hoop. The seal is a compressible seal attached to the side edges of metal hoop, the wooden side walls being clamped to the metal hoop.

10 Claims, 1 Drawing Sheet

VAT SEAL

Figure 1:
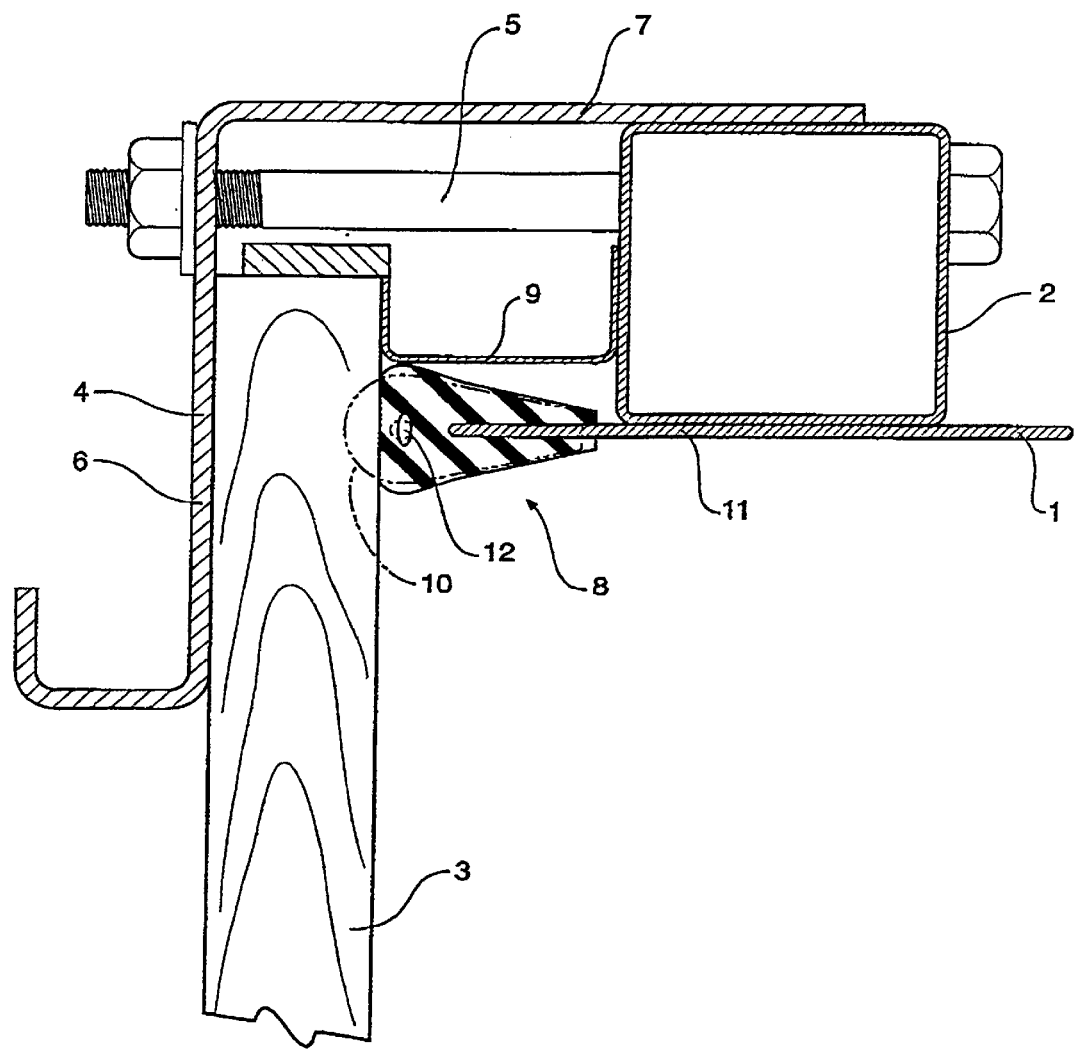

This invention relates to a seal for a vat, more particularly to a seal for a vat to contain a liquid, the vat being constructed of metal and wooden staves.

There is described in AU617673, which is incorporated herein by reference and made apart hereof, a vat constructed of metal ends, top and bottom, the sides being constructed by a plurality of wooden staves sealed together and clamped to the metal surround. This form of vat for the storage of wines with the wooden staves being of oak has created a great deal of interest, for a plurality of the vats can be stacked together and thus due to their shape have a greater storage capacity for a particular cellar or warehouse volume than barrels or the like which have a great volume of unusable storage space between the adjacent stacked circular barrels.

A problem with the seal for such a vat is the fact that the seal must seal between the metal surround and the wooden staves, each of which has a different thermal expansion and also swelling of the wood due to the absorption of liquid into the wood.

This invention is directed to an improved vat construction and seal for a vat as described in the above referred to patent.

In one form of the invention there is provided a seal adapted to be attached to a metal member and to seal against a non metallic member pressed by a clamping member pressing the non metallic member against the seal, said seal being comprised of a compressible member and to seal against a seal retainer.

In another form of the invention there is provided a seal between a metal wall and a wooden wall at right angles to the metal wall, said seal comprising a compressible seal attached to the edge of the metal member and forced into sealing contact with the wooden member by a clamp acting between the metal wall and the surface of the wooden member.

In a preferred form, the seal is comprised of a compressible member attached to the edge of a metal member, the seal also sealing against a seal retainer.

In order to more fully describe the invention, reference will now be made to the accompanying drawings in which:

FIG. 1 is a cross sectional view of portion of a vat showing the seal between the metal body and a stave of the wooden walls.

The vat to which the invention relates is similar to that shown in AU617673 and comprises a generally rectangular metallic loop or hoop forming the top, end walls and bottom of the vat. The vat is completely by the addition of wooden staves clamped to the side edges of the metallic loop or hoop.

Thus, as shown in the drawing, the vat includes the metal loop or hoop 1 forming the vat body, the vat having a main support frame 2 surrounding the metal body on each side of the vat. The drawing shows a top portion of the vat, with the wood staves 3 (only one of which is shown) being positioned vertically, the staves being clamped against the vat body 1 by a clamping plate 4 bolted by a bolt 5 to the main support frame 2. The clamping plate has a vertical portion 6 extending over the ends of the staves 3 and a horizontal portion 7 to extend horizontally over and rest on the main support frame 2.

A seal 8 is provided between the edge of the vat body and the internal surface of the staves 3, there also being a channel shaped seal retainer 9 mounted on the support frame 2.

The seal 8 positioned on the edge of the vat body 11 is formed as a solid compressible member with a hollow section 12 which allows the seal to compress and thus change its shape. As shown in the drawings, the seal in its uncompressed state is shown in dotted lines 10 and when compressed the seal engages against the stave 3 and deforms into a heart shape thus also sealing against the seal retainer 9. The hollow section 12 thus deforms and virtually closes, this allowing the seal to deform and compress and deflect centrally on the center line to form a symmetrical shape to seal on the stave and the seal retainer with relatively small pressure applied to the stave through the tensioning of the bolts. Thus only 10 to 20 ft/lbs tension is applied to the bolts to form an effective seal. The seal is formed as to a long strip to extend around the edge of the vat body, the seal being positioned over the edge of the vat body, with the vat body extending into the seal in the order of ⅔ of the length of the seal. The seal retainer thus retains the seal in position and also locks the seal preventing the seal from sucking inwards should a negative pressure develop within the vat. The seal retainer also prevents excess pressure being applied to the bolt 5 thereby preventing over-compression of the seals.

The sealing member 8 is of rounded shape as shown in dotted lines 10 in the uncompressed state of the seal and in full lines in the compressed state, the seal being compressed when assembled and the bolts tensioned to thus seal against the wooden staves. On compression the sealing member is compressed and expands so that it is forced against the seal retainer. It has been found in a preferred form that the seal can be compressed between 3 mm and 9 mm by a bolt tension of 10 to 20 ft/lbs. Preferably, the seal is compressed 6 mm at a bolt tension of 15 ft/lbs.

Preferably, the material of the sealing member is a silicone material so it may deflect under the compression applied to the sealing member.

The seal thus extends around the edge of the vat body and effectively seals against the wooden staves. The seal while sealing against positive pressure from within the vat, also seals when there is a negative pressure within the vat, for example above the liquid within the vat which may occur during temperature changes, such as when the liquid is cooled or chilled by cooling pipes positioned in the vat.

While the vat has been particularly designed for the storage of wine with oak staves, it is to be realized that the vat can be used for the transport of wine, and also for the storage and transport of other liquids, such as fruit juices. While one form of the invention has been described in some detail, it is to be realized that the invention is not to be limited thereto, but can include variations and modifications falling within the spirit and scope of the invention.

What is claimed is:

1. A vat for the storage of a liquid, said vat constructed by a metal hoop formed into a generally rectangular shape to form the top, end walls and bottom of the said vat, a wooden side wall on each side of said vat, a seal positioned on the edge of the said metal hoop, a frame attached to said metal hoop adjacent each edge thereof and extending around said metal hoop, a seal retainer attached to the side of said frame, clamping means between said frame and said wooden wall to compress said seal against said wooden wall, said retainer bearing on said seal when said seal is compressed.

2. A vat as defined in claim 1 wherein said seal has a peripheral slot to receive said edge of said metal hoop, said hoop extending up to ⅔ the width of said seal.

3. A vat as defined in claim 2 wherein said seal has an internal cavity whereby said seal is compressed in a symmetrical manner.

4. A vat as defined in claim 2 wherein said vat includes an shaped clamping plate extending down the outside of said wooden wall and across to rest on said frame, said clamping means being bolts passing through said clamping plate and said frame.

5. A vat as defined in claim 1 wherein said seal has an internal cavity whereby said seal is compressed in a symmetrical manner.

6. A vat as defined in claim 5 wherein said vat includes an L-shaped clamping plate extending down the outside of said wooden wall and across to rest on said frame, said clamping means being bolts passing through said clamping plate and said frame.

7. A vat as defined in claim 1 wherein said vat includes an L-shaped clamping plate extending down the outside of said wooden wall and across to rest on said frame, said clamping means being bolts passing through said clamping plate and said frame.

8. A vat as defined in claim 7, wherein said seal retainer has a ledge extending outwardly of said vat, said wooden wall being located by said ledge.

9. A vat as defined in claim 1, wherein said seal retainer has a ledge extending outwardly of said vat, said wooden wall being located by said ledge.

10. A vat for the storage of a liquid, said vat constructed by a metal hoop formed into a generally rectangular shape to form a top, end wall and bottom of the vat, a wooden side wall on each side of the vat, a continuous seal attached to and overlapping the free undeformed edges of the metal hoop, and clamping means to clamp the seals against the inside of the wooden walls.

* * * * *